United States Patent [19]

Shepler et al.

[11] Patent Number: 4,984,616
[45] Date of Patent: Jan. 15, 1991

[54] FRONT AND REAR TIRE TREAD PATTERNS IN A FOUR-WHEELED TIRE/VEHICLE SYSTEM

[75] Inventors: Peter R. Shepler, Stow; Nathan A. Gammon, Akron; William M. Hopkins, Hudson; James E. Koerner, Uniontown; Charles K. Schmaltx, Canal Fulton, all of Ohio

[73] Assignee: The Goodyear Tire & Rubber Company, Akron, Ohio

[21] Appl. No.: 357,507

[22] Filed: May 25, 1989

[51] Int. Cl.$^5$ ............................................. B60C 11/03
[52] U.S. Cl. ............................. 152/209 A; 152/209 R
[58] Field of Search .......... 152/209 R, 209 A, 209 D, 152/209 B, 209 WT; D12/88; 296/185

[56] References Cited

U.S. PATENT DOCUMENTS

| | | | |
|---|---|---|---|
| D. 222,918 | 2/1972 | Dallara | D12/88 |
| 223,599 | 5/1972 | Busch et al. | |
| D. 266,919 | 11/1982 | Bennett | |
| D. 283,499 | 4/1986 | Hammond | |
| 284,178 | 1/1986 | Kawadata et al. | |
| 2,154,290 | 4/1939 | Snyder | |
| 3,674,077 | 7/1972 | Verdier | |
| 3,980,118 | 9/1976 | Kinar | |
| 4,424,843 | 1/1984 | Fontaine et al. | |
| 4,424,844 | 1/1984 | Fontaine | |
| 4,456,046 | 6/1984 | Miller | |
| 4,470,443 | 9/1984 | Eraud | |
| 4,545,415 | 10/1985 | Lindner et al. | |
| 4,574,856 | 3/1986 | Graas | |
| 4,722,378 | 2/1988 | Carolla et al. | |
| 4,785,863 | 11/1988 | Tsuda et al. | 152/209 A |
| 4,883,308 | 11/1989 | Singer | 296/185 |

FOREIGN PATENT DOCUMENTS

| | | |
|---|---|---|
| 147223 | 10/1936 | Austria . |
| 0194069 | 2/1986 | European Pat. Off. . |
| 1480962 | 6/1969 | Fed. Rep. of Germany . |
| 2536470 | 2/1977 | Fed. Rep. of Germany . |
| 3612886 | 11/1987 | Fed. Rep. of Germany . |
| 2157211 | 6/1973 | France . |
| 56607 | 7/1985 | Japan . |
| 1585204 | 2/1981 | United Kingdom . |

OTHER PUBLICATIONS

Modern Tire Dealer, Feb. 1988, p. 46.
Ward's Auto World, Feb. 1989, p. 102.

Primary Examiner—Michael W. Ball
Assistant Examiner—Geoffrey L. Knable
Attorney, Agent, or Firm—L. R. Drayer

[57] ABSTRACT

An improved tire/vehicle system for an automotive vehicle has two pneumatic front tires and two pneumatic rear tires. The rear tire treads are wider than the front tire treads and are divided circumferentially into first and second portions. The first portion of each rear tire tread has a width between 50% and 90% of the rear tire's tread width and is arranged to longitudinally track at least a majority of one of the front tire treads. The second portion of the rear tire tread does not longitudinally track any portion of such front tire tread. Each rear tire tread has a tread groove pattern that is asymmetric in character, the respective net-to-gross ratios in each of the first portions of the rear tire treads being at least 27% different from the net-to-gross ratios of their second portions.

3 Claims, 7 Drawing Sheets

FRONT AND REAR TIRE TREAD PATTERNS IN A FOUR-WHEELED TIRE/VEHICLE SYSTEM

BACKGROUND OF THE INVENTION

1. Field of Invention

This invention relates generally to tire/vehicle systems designed for four-wheeled automotive vehicles, and specifically for such systems wherein a portion of the rear tire tread tracks a front tire tread.

2. Description of the Prior Art

In automotive vehicles, proper traction between the tire and the road surface is necessary for effective operation of the vehicle. Under certain weather conditions, such as rain, the traction of the tire on the road surface can be impaired. For example, a vehicle traveling on a rain-soaked road surface at high speed can "hydroplane" and lose contact with the road surface altogether. For this reason, it is desirable that tires be able to channel water away from the footprint of the tire to ensure good traction between the tire and road surface. U.S. Pat. No. 4,545,415 discloses a tire tread designed to provide good traction on slippery road surfaces.

A second problem is that four-wheeled vehicles are usually fitted with identical tires at all four wheel positions even though the operating conditions and performance requirements at each wheel may be different. For example, the functions necessarily performed by each tire, such as steering, load bearing, and transmitting driving torque from the engine to the road surface are usually different at each wheel position.

Some tire designers have sought to maximize vehicle performance by tuning each tire to its wheel position. German Patent No. 1,480,962 discloses a front and rear tire combination in which the compound in the front tire is different from that in the rear tire, the combination designed to improve treadwear. German Patent No. 2,536,470 discloses a front and rear tire combination in which the tread pattern on the front tire is varied slightly from the tread pattern on the rear tire to limit the noise generated by the combination. Japanese Patent No. 58-164360 discloses a front and rear tire combination in which the tread pattern of the front tire differs from that of the rear tire in order to maximize the cornering characteristics of the vehicle.

In addition to the different performance requirements of front and rear tires, an additional difference evidences itself when the road surface is covered with rain or snow. Because the front tire of the vehicle generally precedes the rear tire, and the rear tire generally tracks the front tire, the road condition immediately preceding the rear tire is affected by the front tire. Heretofore this difference has gone largely ignored by tread designers and performance of the rear tire has not been optimized.

Summary of the Invention

The invention disclosed and claimed herein is the result of considering the difference in road conditions between the front tire and the rear tire and designing the rear tire tread differently from the front tire tread in order to optimize the rear tire performance.

In a tire/vehicle system according to the invention, the vehicle has two pneumatic front tires and two pneumatic rear tires. The rear tires are wider than the front tires. Each of the tires has a grooved tread. The rear tire treads are divided circumferentially into first and second portions. The first portion of each rear tire tread has a width between 50% and 90% of the rear tire tread width and is disposed between the second portion and one tread edge. The sum of the widths of the first and second portions are equal to the rear tire tread width. The first portion of each rear tire tread is arranged to longitudinally track at least a majority of one of the front tire treads and the second portion of each rear tire tread does not track any portion of such one of the front tire treads. Each rear tire tread has a tread groove pattern that is asymmetric in character. The respective net-to-gross ratios of each of the first portions of the rear tire treads are at least 2% different from the net-to-gross ratios of their second portions.

In another embodiment of the invention, a tire/vehicle system designed for year round or high speed use by an automotive passenger vehicle on paved road surfaces has two pneumatic front tires and two pneumatic rear tires. Each tire has a grooved tread. Each rear tire has at least a portion of its tread track one of the front tire treads. The net-to-gross ratio of each rear tire tread is at least 2% less than that of the front tire tread that it tracks.

BRIEF DESCRIPTION OF THE DRAWINGS

Other aspects of the invention will become apparent from the following description when read in conjunction with the accompanying drawings wherein.

DESCRIPTION OF THE PREFERRED EMBODIMENTS

The invention also may be better understood in the context of the following definitions, which are applicable to both the specification and to the appended claims:

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Equatorial plane (EP)" means the plane perpendicular to the tire's axis of rotation and passing through the center of its tread.

"Dividing plane (DP)" means a plane perpendicular to the tire's axis of rotation that divides a tire according to the present invention into a first portion and a second portion or a first zone, second zone or third zone.

"Casing" means the carcass, belt structure, beads, sidewalls, and all other components of the tire excepting the tread and undertread. The casing may be new, unvulcanized rubber or previously vulcanized rubber to be fitted with a new tread.

"Tread" means a molded rubber component which, when bonded to a tire casing, includes that portion of a tire that comes into contact with the road when the tire is normally inflated and under normal load.

"Tread width" means the arc length of the tread surface in the axial direction, that is, in a plane passing through the tire's axis of rotation.

"Footprint" means the contact patch or area of contact with the tire tread with a flat surface under normal load and pressure or under specified load, pressure and speed conditions.

"Net-to-gross ratio" means the ratio of the area of the tire tread rubber that makes contact with the road surface while in the footprint, divided by the area of the tread in the footprint, including non-contacting portions such as grooves.

"Tracking" means that in a tire/vehicle system where two tires are mounted on separate axles so that a front tire precedes a rear tire when the vehicle is being normally operated in a straight line, the rear tire contacts the same portions of the road surface as did the front tire.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tie bars" tending to maintain a rib-like character in the tread region involved.

"Axial" and "axially" are used herein to refer to lines or directions that are parallel to the axis of rotation of the tire.

"Radial" and "radially" are used to mean directions radially toward or away from the axis of rotation of the tire.

"Year-round" means a full calendar year through each season. For example, a snow tire is not designed for year-round use since it creates objectionable noise on dry road surfaces and is designed to be removed when the danger of snow is passed.

Figure 1:
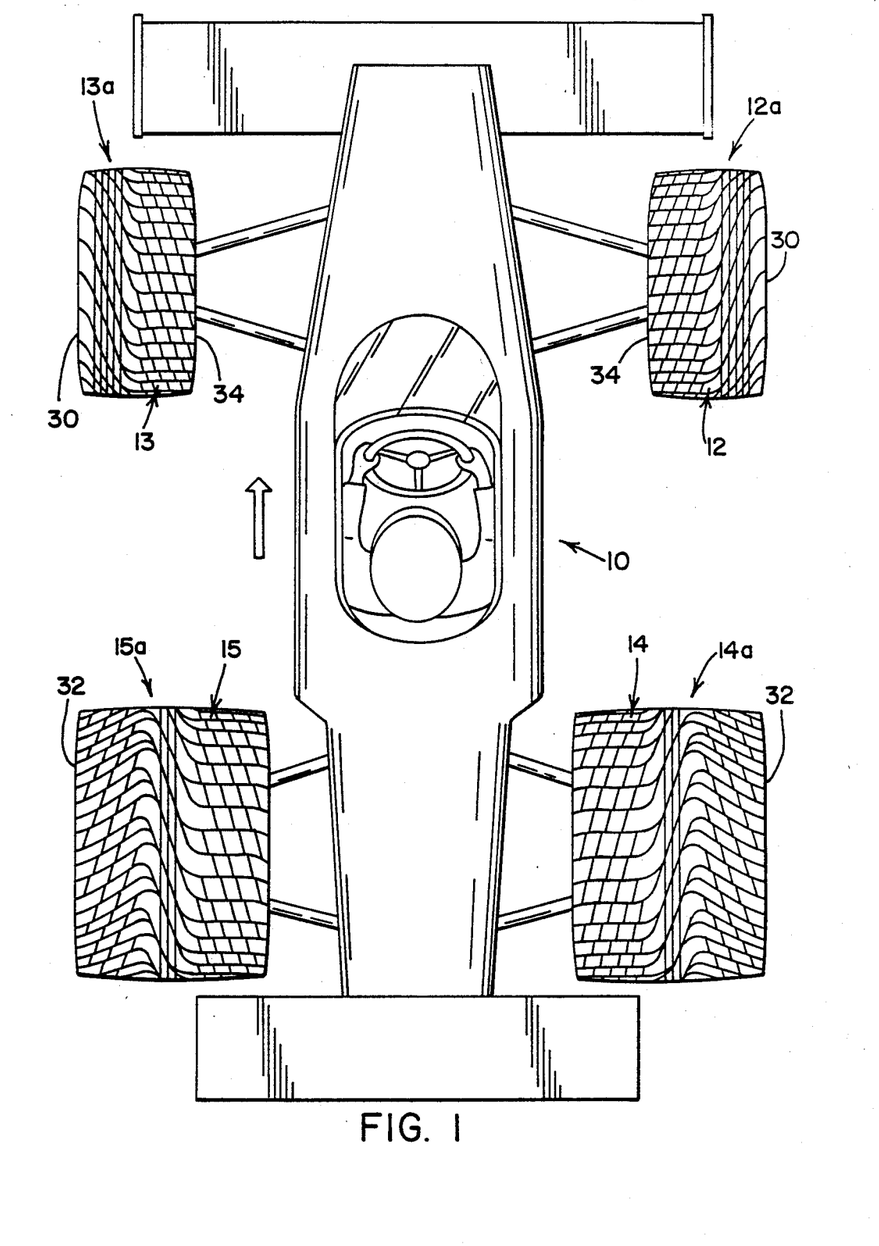
FIG. 1 is a plan view of a tire/vehicle system according to the present invention.

In the drawings, the same numerals are used for the same components or items in the several views. With particular reference now to FIG. 1, there is illustrated a vehicle 10 according to the present invention.

Figure 2:
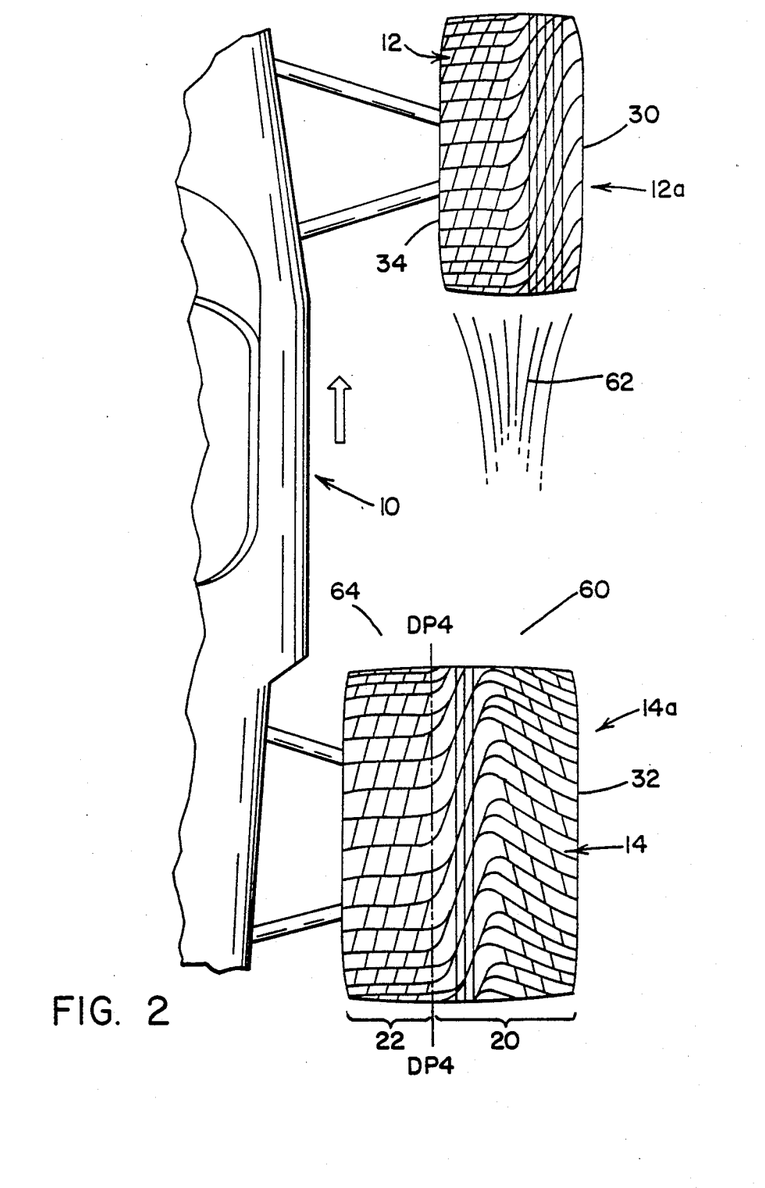
FIG. 2 is an enlarged plan view of a front tire/rear tire combination according to the present invention.

While the vehicle shown in FIGS. 1 and 2 is a race car, and the invention was designed primarily for use in racing on wet tracks, the scope of the invention is not limited to race tires.

With reference to FIG. 1, the vehicle has two front tires 12a, 13a and two rear tires 14a, 15a. Each front tire and each rear tire have an associated tread 12, 13, 14, 15. In the normal mode of operation, the vehicle is driven in the direction of the arrow so that each front tire precedes each rear tire, although the vehicle may be driven in the opposite direction, for example, when parking.

As shown in FIG. 2, the rear tire 14a is mounted so that at least a portion of the rear tire tread 14 longitudinally tracks at least a portion of the front tire tread 12. The portion of the rear tire tread that tracks the front tire tread is called the first portion 20 and the portion of the rear tire tread which does not track the front tire tread is called the second portion 22. While it is possible to practice the invention in a tire vehicle/system wherein each part of the rear tire tread tracks the front tire tread, in the preferred embodiment the rear tires are wider than the front tires and therefore a portion of the rear tire tread does not track the front tire tread. It is also possible to practice the invention in a tire/vehicle system wherein the rear tire tread has a second portion of the rear tire tread on each side of the first portion of the rear tire tread. In the preferred embodiment, each rear tire tread has one first portion 20 and one second portion 22.

The first portion 20 has a width between 50% and 90% of the rear tire tread width and is disposed between the second portion and a tread edge. The first portion is preferably disposed laterally outwardly with respect to the vehicle of the second portion of the rear tire tread. At 0 degrees slip angle, the outermost edge of the front tire tread 30 is generally equidistant from the vehicle's centerline as the outermost edge 32 of the rear tire tread.

Figure 3:
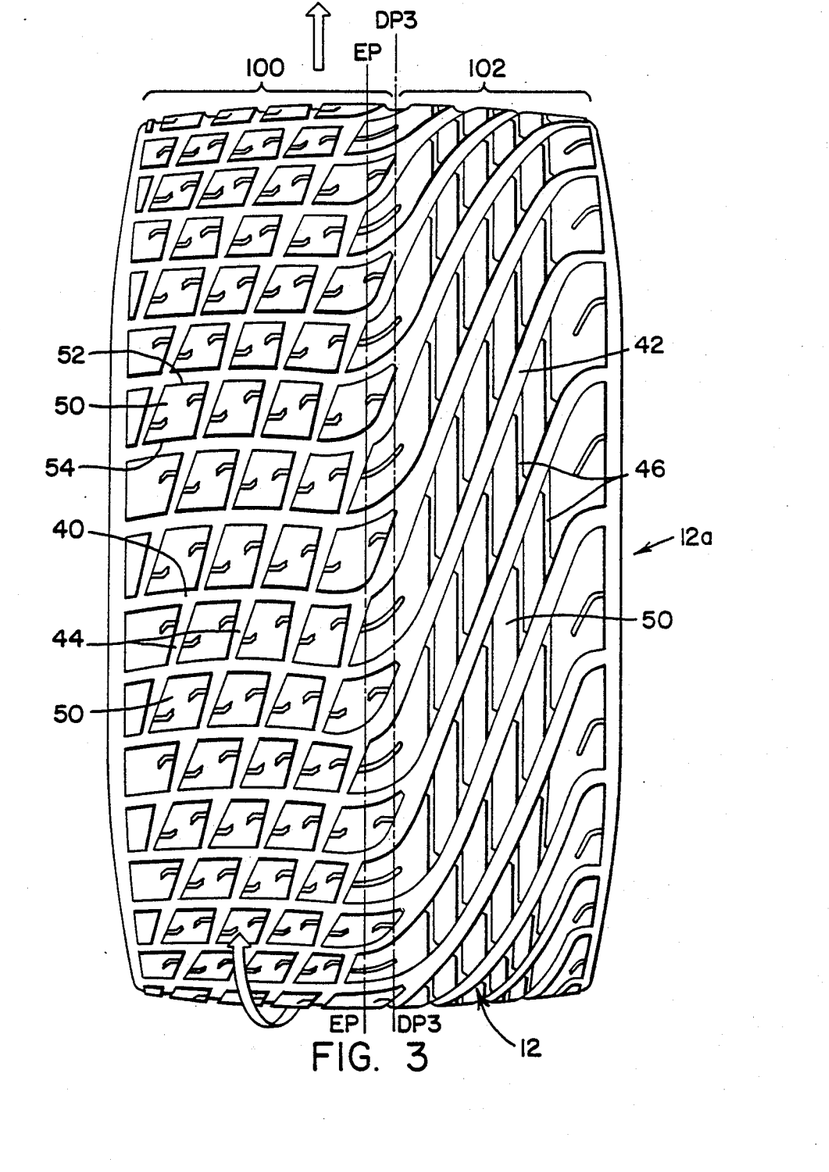
FIG. 3 is a plan view of the right front tire tread of one embodiment of the invention.
Figure 4:
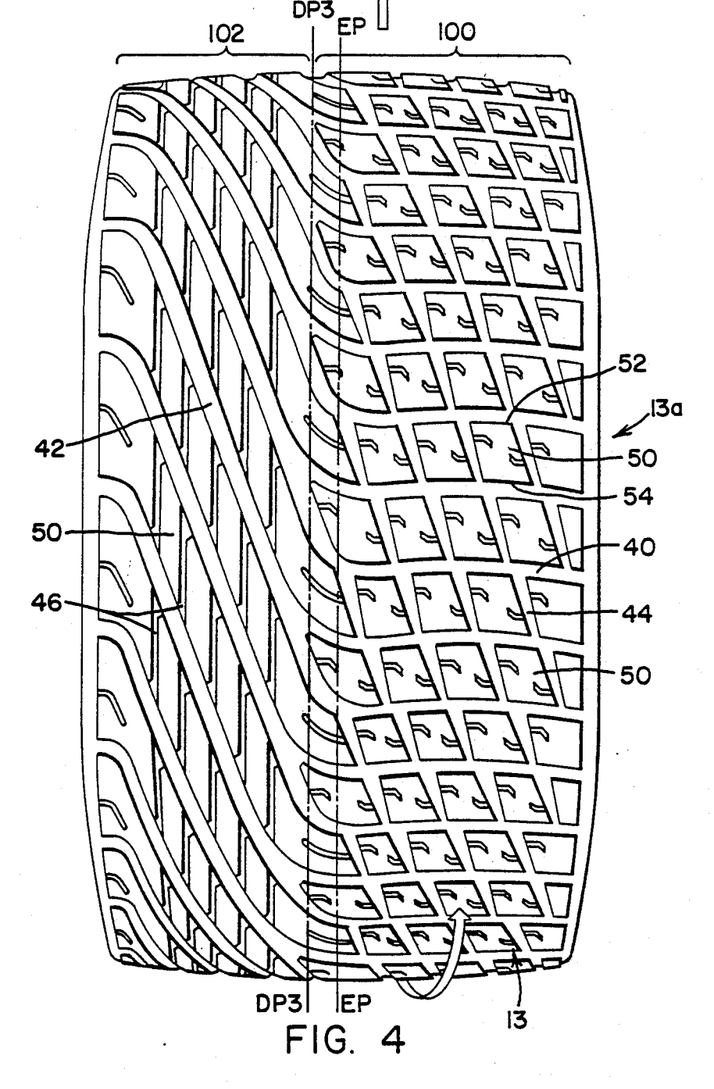
FIG. 4 is a plan view of the left front tire tread of one embodiment of the invention.

With reference to FIGS. 3 and 4, each front tire 12a, 13a has a tread 12, 13 which may be formed into a tread pattern to provide certain performance objectives. In the preferred embodiment, the front tire tread has first and second circumferentially extending zones 100, 102. The first zone is separated from the second zone by a dividing plane DP3. The dividing plane is parallel to the tire's equatorial plane. The edges of the zones are parallel to the equatorial plane EP of the front tire. Each zone has a width between 40% and 60% of the front tire width. In the preferred embodiment, the first zone 100 has a width equal to 55% of the front tire tread width and the second zone has a width equal to 45% of the front tire tread width. The first zone 100 of the front tire tread 12, 13 has substantially aligned lateral wide groove segments 40 extending across the width of the first zone. The centerlines of these lateral wide groove segments, over a majority of their length in the first zone, form an angle between 70 degrees and 90 degrees, and preferably 90 degrees, when measured with respect to a plane in the first zone which is parallel to the equatorial plane EP. The primary function of the first zone of the front tire tread is longitudinal traction during deceleration.

The second zone 102 has substantially aligned lateral wide groove segments 42 extending across the width of the second zone. The lateral wide groove segments, over a majority of their length in the second zone, have a centerline forming an angle between 10 degrees and 45 degrees, and preferably 23 degrees, when measured with respect to a plane in the second zone which is parallel to the equatorial plane EP. The lateral wide grooves of the first zone merge into the lateral wide grooves of the second zone. The primary function of the second zone is traction during cornering.

With reference to FIGS. 3 and 4, the front tire tread 12, 13 has other wide grooves 44, 46 which intersect the lateral wide grooves 40, 42 to form blocks 50. The other wide grooves 44 in the first zone 100 form an angle between 10 degrees and 45 degrees, and preferably 20 degrees, with a plane in the first zone 100 which is parallel to the equatorial plane EP. The other wide grooves 46 in the second zone 102 form an angle between 0 degrees and 10 degrees preferably 0 degrees, with a plane in the second zone 102, which is parallel to the equatorial plane. The blocks have a leading edge 52 and a trailing edge 54. The leading edge of the blocks contacts the road surface prior to the trailing edge of such blocks when the tire is rotating in its forward direction. The trailing edge 54 of the blocks 50 on the front tire 12, 13 in the first zone 100 are wider than the leading edge 52 of such blocks. In the preferred embodiment, the front tires are free-rolling, as opposed to driven, and are the most important tires for braking. The trailing edge of the blocks assist in improving longitudinal traction during deceleration.

Tread designs utilized on the front tire tread 12, 13 tend to disperse water from the footprint in different ways. Some tread designs tend to direct water at right angles to the vehicle's movement. In this case the front tire clears a path for the rear tire. For example, with reference to FIG. 2, if 60 represents a location on the road surface that was recently vacated by the passage of the front tire tread 12, 13 the water depth will briefly be less than it was when the front tire passed over it. When the speed of the vehicle is great enough, the first portion 20 of the rear tire 14a, 15a will pass over location 60 before the water can return. In this case, the front tire tread will be driven through deeper water than the rear tire tread. In such cases, the second portion 22 of the rear tire tread 14, 15 also may be driven through deeper water at location 64 than the first portion 20 of the rear tire tread.

Other front tire tread designs tend to direct water behind the front tire in a direction generally parallel to the vehicle's direction, causing the water depth at location 60 to be briefly greater when the rear tire reaches location 60, than it was when the front tire reached location 60. In this case, the first portion 20 of the rear tire tread 14, 15 will be driven through deeper water than the front tire tread 12, 13. In such cases, the first portion 20 of the rear tire tread may also be driven through deeper water than the second portion 22 of the rear tire tread. The spray 62 from the front tire is sometimes directed upward and rearward so that grooves in the rear tire tread may be partially filled with water before they enter the footprint.

In the preferred embodiment, the front tire 12a, 13a utilizes a tread pattern as shown in FIGS. 3 and 4. This tread pattern tends to direct a large portion of the spray rearward, so that the first portion 20 of the rear tire tread 14, 15 passes through deeper water than either the front tire tread 12, 13 and the second portion 22 of the rear tire tread 14, 15.

Figure 5:
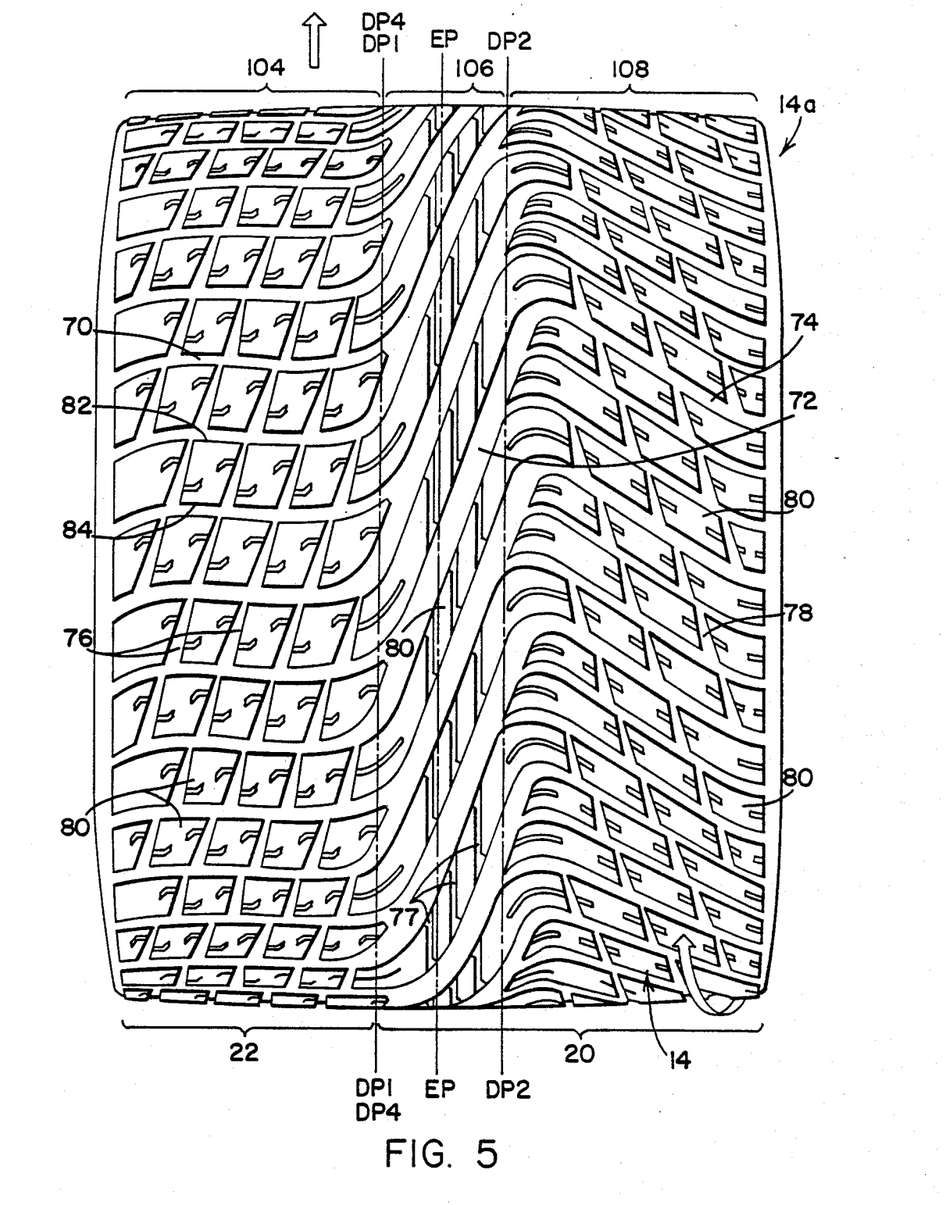
FIG. 5 is a plan view of the right rear tire tread of one embodiment of the invention.
Figure 6:
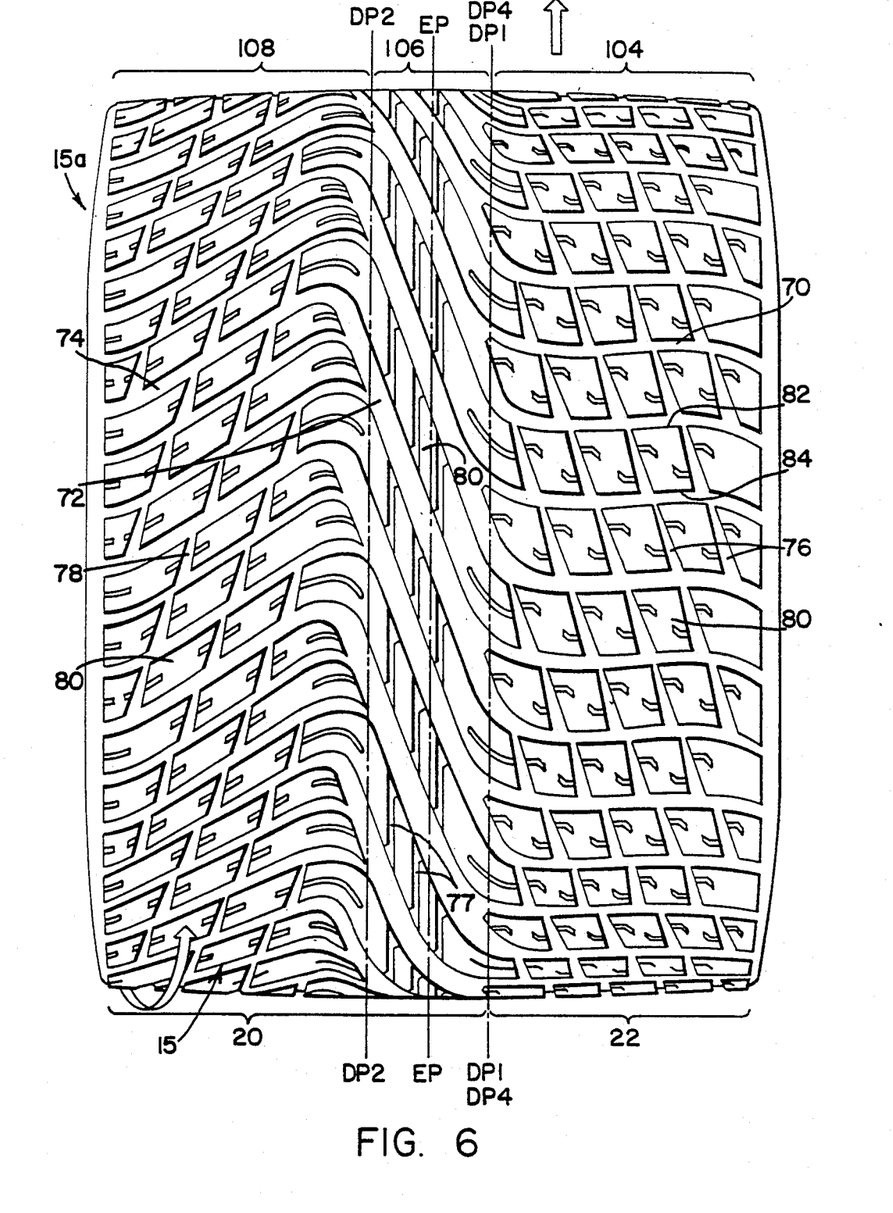
FIG. 6 is a plan view of the left rear tire tread of one embodiment of the invention.

With reference to FIGS. 5 and 6, the rear tire tread 14, 15 is characterized by three circumferentially extending zones 104, 106, 108. In that the zones 100, 102 of the first tire are designated first and second zone, of three zones of the rear tire are designated third, fourth and fifth zones. The third, fourth and fifth zones 104, 106, 108 of the rear tire 14a, 15a extend circumferentially about the tire so that the edges of the zones are parallel to the equatorial plane EP of the rear tire and the fourth zone 106 is disposed between the third zone 104 and the fifth zone 108. A plane designated DP1 separates the third zone and the fourth zone while a plane DP2 separates the fourth zone and the fifth zone. Both planes (DP1, DP2) are parallel to the equatorial plane of the tire.

The width of the third zone 104 is between 25% and 50% of the tread width of the rear tire 14a, 15a. The width of the fourth zone 106 is between 15% and 35% of the tread width of the rear tire and the width of the fifth zone 108 is between 25% and 50% of the tread width of the rear tire.

The third zone 104 has substantially aligned lateral wide groove segments 70 which extend across the width of the third zone. These lateral wide groove segments have center lines which form angles between 70 degrees and 90 degrees when measured with respect to a plane in the third zone which is parallel to the equatorial plane EP of the rear tire 14a, 15a.

The fourth zone 106 has substantially aligned lateral wide groove segments 72 extending generally perpendicular to the lateral wide groove segments 74 in the fifth zone 108. The lateral wide grooves 72 of the fourth zone 106 form an angle between 10 degrees and 45 degrees with a plane in the fourth zone that is parallel to the equatorial plane of the tire.

The fifth zone 108 has substantially aligned lateral wide groove segments 74 extending across the width of the fifth zone, the centerlines of the lateral wide groove segments forming an angle between 45 degrees and 70 degrees with a plane in the fifth zone parallel to the equatorial plane of the rear tires 14a, 15a.

In the preferred embodiment, the centerlines of the grooves 70 in the third zone 104 form an angle of 90 degrees with a plane in the third zone that is parallel to the equatorial plane, the centerlines of the grooves 72 in the fourth zone 106 form an angle of 23 degrees with a plane in the fourth zone that is parallel to the equatorial plane, and the centerlines of the grooves 74 in the fifth zone 108 form an angle of 59 degrees with a plane in the fifth zone that is parallel to the equatorial plane. The primary purpose of the third zone is longitudinal traction during acceleration. The primary purpose of the fifth zone is lateral traction for cornering and to prevent sliding. The nearly perpendicular relationship between the grooves 72 of the fourth zone 106 and the grooves 74 of the fifth zone 108 is designed to inhibit lateral sliding of the rear tires 14a, 15a during turns while continuing to provide good longitudinal traction for acceleration.

The rear tire tread has other wide groove segments 76, 77, 78 which intersect the lateral wide groove segments 70, 72, 74 to form blocks 80. The blocks have a leading edge 82 and a trailing edge 84. The leading edge of the blocks contacts the road surface prior to the trailing edge of the blocks when the tire is rotating in its forward direction. The leading edge of the blocks in the third zone 104 is wider than the trailing edge of the blocks in the third zone. In the preferred embodiment, the rear tire is driven and the leading edge of the blocks assist in improving longitudinal traction during acceleration. The blocks in the third zone are shaped like trapegards and the blocks in the fourth and fifth zones are shaped like parallelograms.

With reference to FIGS. 2, 5 and 6, the rear tire is further characterized by a dividing plane DP4. The dividing plane DP4 of each rear tire tread 14a, 15a is generally in the same plane as the innermost edge of the front tire tread 34. The dividing plane DP4 is parallel to the equatorial plane EP. In the preferred embodiment, the dividing plane DP4 is coincident with plane DP1. The dividing plane DP4 divides the rear tire tread 14, 15 into first portions 20 and second portions 22. In other words, in the preferred embodiment of the rear tire 14a, 15a, the first portion 20 is made up of the fourth and fifth zones 106, 108, and the second portion 22 is made up of the third zone 104.

The rear tire tread 14, 15 in the first portion 20 is different from that of the second portion 22 because, when the road surface is wet, the water depth on the road surface 60 immediately preceding the first portion of the rear tire tread is different from the water depth on the road surface 64 immediately preceding the second portion of the rear tire tread. This difference is due to the longitudinal tracking of the front tire tread 12, 13 by that of the first portion of the rear tire tread. The invention takes this difference into account by optimizing the tread design of the rear tire tread in accordance with the condition of the road surface preceding it.

Figure 7:
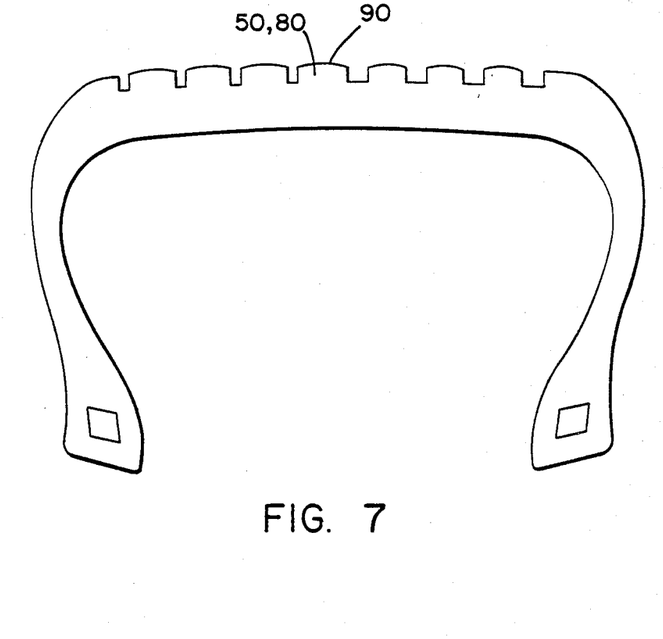
FIG. 7 is a cross-sectional view of a tire according to one embodiment of the invention.

Such optimization is accomplished by adjusting the net-to-gross ratio of the rear tire tread 14, 15. The tread's net-to-gross ratio must be low enough to ensure that the tread's void areas can accommodate any water on the road surface with reference to FIG. 7, when the grooves and other void areas are properly sized, as the tire enters the footprint, water is channeled out of the footprint by the void areas, enabling the radially outermost surface 90 of the tread blocks 50, 80 to make contact with the road surface. If the void areas are too small, a portion of the water is trapped between the blocks and the road surface. This results in unacceptable tire traction and vehicle handling. The radially outermost surface 90 of the block 50 is convexly curved in the radially outward direction. In the preferred embodiment, this curvature in the axial direction only: the circumferential direction has no curvature apart from the usual curvature associated with a round tire. The curvature of the surface of the element helps move water from the center of the block to the tread groove. The curvature shown is FIG. 7 is exaggerated for clarity. In the preferred embodiment, the actual radius of curvature for the block surface is about 4 inches. This crowning helps prevent water being trapped between the block and the road surface.

On the other hand, if the tire tread has a net-to-gross ratio that is too low, tire traction, especially peak traction, and treadwear will be lowered. With reference to FIGS. 3-6, in a tire tread with a low net-to-gross ratio, the blocks 50, 80 of the tread must bear a correspondingly greater percentage of the vehicle load. This higher loading of individual tread blocks lowers the treadwear of the tire. Additionally, blocks in a low net-to-gross ratio tread deflect more due to the higher loading. This additional deflection is undesirable for handling, especially under hard cornering.

With reference to FIG. 2, in the case of the front tire tread 12, 13 directing water from the footprint away from the rear tire tread 14, 15, the road surface 60 preceding the first portion 20 of the rear tire tread will briefly have a lesser water depth than the road surface 64 immediately preceding the second portion 22 of the rear tire tread 14, 15.

In such case, the first portion 20 of the rear tire tread 14, 15 has a higher net-to-gross ratio than the front tire tread 12, 13. Because the water depth encountered by the first portion of the rear tire tread is less than that encountered by the front tire tread, less area of the first portion of the rear tire tread needs to be in the form of grooves. The higher net-to-gross of the rear tire improves its treadwear and traction.

In the case of the front tire tread 12, 13 directing water from the footprint toward the rear tire 14a, 15a the road surface 60 immediately preceding the first portion 20 of the rear tire tread 14, 15 will briefly have a greater water depth than the road surface 64 immediately preceding the second portion 22 of the rear tire tread 14, 15.

In such case, the first portion 20 of the rear tire tread 14, 15 has a lower net-to-gross ratio than the front tire tread 12, 13. Because the water depth encountered by the first portion of the rear tire tread is more than that encountered by the front tire tread, more area of the first portion of the rear tire tread must be in the form of grooves. The lower net-to-gross of the rear tire tread enables it to pass through the deeper water and still maintain good traction with the road surface.

In a rear tire according to the invention, the net-to-gross ratio of the first portion 20 of the rear tire tread 14, 15 is at least 2% different from the net-to-gross ratios of the second portion 22 of the rear tire tread. In the preferred embodiment, the net-to-gross ratio of the first portion 20 of the rear tire tread is 10% less than the net-to-gross ratio of the second portion, with the net-to-gross ratio of the first portion being equal to 57% and the net-to-gross ratio of the second portion being equal to 67%. Because the rear tire 14a, 15a is divided into two portions made up of the third, fourth and fifth circumferentially extending zones 104, 106, 108, the net-to-gross ratios of the individual zones may be different than the net-to-gross ratio of the portion. In tires according to the preferred embodiment, the net-to-gross ratio of each zone in the rear tire is at least 4% different from the other zones in such tire. The third zone 104 of a rear tire 14a, 15a according to the present invention has a net-to-gross between 62% and 72%, with the preferred embodiment being 67%. The fourth zone 106 of a rear tire according to the preferred embodiment has a net-to-gross ratio between 45% and 55%, with the currently preferred embodiment being 50%. The fifth zone 108 of a rear tire according to the preferred embodiment has a net-to-gross ratio between 56% and 66%, with the preferred net-to-gross ratio being 61%.

In the currently preferred combination of front tire and rear tire, the first zone of the front tire tread has a net-to-gross ratio between 60% and 70% with the preferred net-to-gross ratio being 65%. The net-to-gross ratio of the second zone of the front tire tread is between 54% and 64% with the net-to-gross ratio of the second zone being at least 5% less than the net-to-gross ratio of the first zone. The currently preferred net-to-gross ratio of the second zone of the front tire tread is 59%.

Based on the foregoing description of the invention What is claimed is:

1. An improved tire/vehicle system designed for year-round or high speed use as an automotive passenger vehicle on paved road surfaces, the vehicle having two pneumatic front tires mounted thereon and two pneumatic rear tires mounted thereon, each said tire having a tread with grooves therein, at least a portion of the tread of each rear tire tracking one of the front tires, the net-to-gross ratio of each tread of each rear tire being at least 2% less than that of the tread of the front tire that it tracks;

each said front tire tread comprising first and second circumferentially extending zones, the zones having edges which are parallel to the equatorial plane of the front tire, each zone having a width of between 40% of 60% of the width of the front tire tread, said first zone having a net-to-gross ratio between 60% and 70% and a width between 7 and 17 centimeters with substantially aligned lateral wide groove segments extending thereacross, and along a majority of its length in the first zone each lateral wide groove forms an angle between 70° and 90° with respect to a plane parallel to the equatorial plane of the front tire; the second zone having a net-to-gross ratio between 54% and 64% and a width between 7 and 17 centimeters with substantially aligned lateral wide groove segments extending thereacross, along the majority of its length in the second zone each lateral width groove has a centerline which forms an angle between 10° and 45° with respect to a line parallel to the equatorial plane, the net-to-gross ratio of the second zone being at least 5% less than the net-to-gross ratio of the first zone, the lateral wide grooves of the second zone merging into the lateral wide grooves of the first zone, wide grooves in the tread intersect the lateral wide grooves to form blocks, which each have a leading and trailing edge, the trailing edges of the blocks in the first zone being wider than the leading edges of the same blocks;

each rear tire tread comprising third, fourth and fifth circumferentially extending zones, said zones having edges which are parallel to the equatorial plane of the rear tire, the fourth zone being disposed between the third zone and the fifth zone, the axial width of said third zone being between 25% and 50% of the axial width of said rear tire tread and having a net-to-gross ratio between 62% and 72%, lateral wide groove segments extending thereacross and having centerlines forming angles between 70 degrees and 90 degrees with respect to the equatorial plane of the rear tire, the width of the fourth zone being between 15% and 35% of the width of said tread, and having a net-to-gross ratio between 45% and 55% with wide groove segments therein which extend generally perpendicular to wide groove segments extending across the fifth zone, the width of the fifth zone being between 25% and 50% of the width of said rear tread and having a net-to-gross ratio between 56% and 66% with the lateral wide groove segments extending thereacross forming an angle between 45 degrees and 70 degrees with a plane parallel to the equatorial plane of the rear tire, the net-to-gross ratio of each zone in each said rear tire tread being at least 4% different from the other zones of the same tread and each said rear tire having wide groove segments which intersect said lateral wide groove segments to form blocks having leading and trailing edges, the leading edges of the blocks in the third zone being wider than the trailing edges of the blocks of the third zone.

2. An improved tire/vehicle system as in claim 1 wherein the front tire is free-rolling.

3. An improved tire/vehicle system as in claim 1 wherein the rear tire is driven.

* * * * *